US007007031B2

(12) United States Patent
MacInnis et al.

(10) Patent No.: US 7,007,031 B2
(45) Date of Patent: Feb. 28, 2006

(54) MEMORY SYSTEM FOR VIDEO DECODING SYSTEM

(75) Inventors: Alexander G. MacInnis, Los Altos, CA (US); Jose' R. Alvarez, Sunnyvale, CA (US); Sheng Zhong, Fremont, CA (US); Xiaodong Xie, Fremont, CA (US); Vivian Hsiun, Yorba Linda, CA (US)

(73) Assignee: Broadcom Corporation, Irvine, CA (US)

( * ) Notice: Subject to any disclaimer, the term of this patent is extended or adjusted under 35 U.S.C. 154(b) by 327 days.

(21) Appl. No.: 10/114,886

(22) Filed: Apr. 1, 2002

(65) Prior Publication Data

US 2003/0187824 A1    Oct. 2, 2003

(51) Int. Cl.
 *G06F 7/00* (2006.01)
 *G06F 17/00* (2006.01)
 *G06F 12/00* (2006.01)
 *G06F 12/14* (2006.01)
 *G06F 15/00* (2006.01)
 *G06F 9/30* (2006.01)
 *G06F 9/40* (2006.01)

(52) U.S. Cl. .................. 707/101; 711/3; 711/173; 712/212

(58) Field of Classification Search ............... 707/101; 712/212; 382/233; 711/3, 173
See application file for complete search history.

(56) References Cited

U.S. PATENT DOCUMENTS

| 5,329,318 | A | * | 7/1994 | Keith ........................ 348/699 |
| 5,428,460 | A | * | 6/1995 | Kabeya et al. .............. 358/451 |
| 5,594,660 | A | * | 1/1997 | Sung et al. ............... 715/500.1 |
| 5,649,029 | A | * | 7/1997 | Galbi ........................ 382/233 |
| 5,809,270 | A | | 9/1998 | Robbins |
| 6,246,720 | B1 | * | 6/2001 | Kutner et al. .......... 375/240.25 |
| 6,253,293 | B1 | | 6/2001 | Rao et al. |
| 6,404,817 | B1 | * | 6/2002 | Saha et al. ............. 375/240.27 |
| 6,538,656 | B1 | | 3/2003 | Cheung et al. ............. 345/519 |
| 6,574,273 | B1 | * | 6/2003 | Luna et al. ................. 375/240 |
| 2001/0039636 | A1 | * | 11/2001 | Hammons et al. .......... 714/752 |

OTHER PUBLICATIONS

U.S. Appl. No. 09/437,208 entitled "Graphics Display System", filed Nov. 9, 1999, Inventor: Alexander G. MacInnis et al.

U.S. Appl. No. 09/641,374 entitled "Video, Audio And Graphics Decode, Composite And Display System", filed Aug. 18, 2000, Inventor: Alexander G. MacInnis et al.

(Continued)

*Primary Examiner*—Uyen Le
*Assistant Examiner*—Cheryl M Fernandes
(74) *Attorney, Agent, or Firm*—McAndrews, Held & Malloy, Ltd.

(57) ABSTRACT

System and method of data unit management in a decoding system employing a decoding pipeline. Each incoming data unit is assigned a memory element and is stored in the assigned memory element. Each decoding module gets the data to be operated on, as well as the control data, for a given data unit from the assigned memory element. Each decoding module, after performing its decoding operations on the data unit, deposits the newly processed data back into the same memory element. In one embodiment, the assigned memory locations comprise a header portion for holding the control data corresponding to the data unit and a data portion for holding the substantive data of the data unit. The header information is written to the header portion of the assigned memory element once and accessed by the various decoding modules throughout the decoding pipeline as needed. The data portion of memory is used/shared by multiple decoding modules.

4 Claims, 9 Drawing Sheets

OTHER PUBLICATIONS

U.S. Appl. No. 09/641,936 entitled "Video And Graphics System With An MPEG Video Decoder For Concurrent Multi-Row Decoding", filed Aug. 18, 2000, Inventor: Ramanujan K. Valmiki et al.

U.S. Appl. No. 09/643,223 entitled "Video And Graphics System With MPEG Specific Data Transfer Commands", filed Aug. 18, 2000, Inventor: Ramanujan K. Valmiki et al.

U.S. Appl. No. 09/640,670 entitled "Video And Graphics System With Video Scaling", filed Aug. 18, 2000, Inventor: Alexander G. MacInnis et al.

U.S. Appl. No. 09/641,930 entitled "Video And Graphics System With A Video Transport Processor", filed Aug. 18, 2000, Inventor: Ramanujan K. Valmiki et al.

U.S. Appl. No. 09/641,935 entitled "Video And Graphics System With Parallel Processing Of Graphics Windows", filed Aug. 18, 2000, Inventor: Alexander G. MacInnis et al.

U.S. Appl. No. 09/642,510 entitled "Video And Graphics System With A Single-Port RAM", filed Aug. 18, 2000, Inventor: Xiaodong Xie.

U.S. Appl. No. 09/642,458 entitled "Video And Graphics System With An Integrated System Bridge Controller", Inventor: Alexander G. MacInnis et al.

Lee et al: "Data Flow Processor for Multi-Standard Video Codec", Custom Integrated Circuits Conference, 1994, Proceedings of the IEEE 1994 San Diego, CA, USA May 1-4, 1994, New York, NY, USA, IEEE, May 1, 1994, pp 103-106, XP010129914, ISBN: 0-7803-1886-2.

* cited by examiner

| (0, 0) | (0, 1) | (0, 2) | (0, 3) | (0, 4) | |
|--------|--------|--------|--------|--------|---|
| (1, 0) | (1, 1) | (1, 2) | (1, 3) | (1, 4) | |
| (2, 0) | (2, 1) | (2, 2) | (2, 3) | | |
| | | | | | |
| | | | | | |

FIG. 6

| | Stage 1 (700) | Stage 2 (710) | Stage 3 (720) | Stage 4 (730) | Stage 5 (740) | Stage 6 (750) | Stage 7 (760) |
|---|---|---|---|---|---|---|---|
| 202 Core Processor | (0,0) $B_0$ | (0,1) $B_1$ | (0,2) $B_2$ | (0,3) $B_3$ | (0,4) $B_4$ | (0,5) $B_0$ | (0,6) $B_1$ |
| 206 COP | | (0,0) $B_0$ | (0,1) $B_1$ | (0,2) $B_2$ | (0,3) $B_3$ | (0,4) $B_4$ | (0,5) $B_0$ |
| 208 HW ACC$_1$ | | | (0,0) $B_0$ | (0,1) $B_1$ | (0,2) $B_2$ | (0,3) $B_3$ | (0,4) $B_4$ |
| 210 HW ACC$_2$ | | | | (0,0) $B_0$ | (0,1) $B_1$ | (0,2) $B_2$ | (0,3) $B_3$ |
| 204 Bridge | | | | | (0,0) $B_0$ | (0,1) $B_1$ | (0,2) $B_2$ |

FIG. 7a

|  | Stage 1 | Stage 2 | Stage 3 | Stage 4 | Stage 5 | Stage 6 | Stage 7 |
|---|---|---|---|---|---|---|---|
| Core Processor | (0,0) $B_0$ | (0,1) $B_1$ | (0,2) $B_2$ | (0,3) $B_3$ | (0,4) $B_0$ | (0,5) $B_1$ | (0,6) $B_2$ |
| COP | (0,0) $B_0$ | (0,1) $B_0$ | (0,2) $B_2$ | (0,3) $B_3$ | (0,4) $B_0$ | (0,5) $B_1$ | (0,6) $B_2$ |
| HW ACC$_1$ |  | (0,0) $B_0$ | (0,1) $B_1$ | (0,2) $B_2$ | (0,3) $B_3$ | (0,4) $B_0$ | (0,5) $B_1$ |
| HW ACC$_2$ |  |  | (0,0) $B_0$ | (0,1) $B_1$ | (0,2) $B_2$ | (0,3) $B_3$ | (0,4) $B_0$ |
| Bridge |  |  |  | (0,0) $B_0$ | (0,1) $B_1$ | (0,2) $B_2$ | (0,3) $B_3$ |

FIG. 7b

|   | Stage 1 | Stage 2 | Stage 3 | Stage 4 | Stage 5 | Stage 6 | Stage 7 | Stage 8 |
|---|---|---|---|---|---|---|---|---|
| Core Processor | (0,0) $B_0$ | (1,0) $B_1$ | (0,1) $B_2$ | (1,1) $B_3$ | (0,2) $B_4$ | (1,2) $B_0$ | (0,3) $B_1$ | (1,3) |
| COP-Unit A | (0,0) $B_0$ | (0,0) $B_0$ | (0,1) $B_2$ | (0,1) $B_2$ | (0,2) $B_4$ | (0,2) $B_4$ | (0,3) $B_1$ | (0,3) $B_1$ |
| COP-Unit B |  | (1,0) $B_1$ | (1,0) $B_1$ | (1,1) $B_3$ | (1,1) $B_3$ | (1,2) $B_0$ | (1,2) $B_0$ | (1,3) |
| HW ACC$_1$ |  |  | (0,0) $B_0$ | (1,0) $B_1$ | (0,1) $B_2$ | (1,1) $B_3$ | (0,2) $B_4$ | (1,2) $B_0$ |
| HW ACC$_2$ |  |  |  | (0,0) $B_0$ | (1,0) $B_1$ | (0,2) $B_2$ | (1,2) $B_3$ | (0,3) $B_4$ |
| Bridge |  |  |  |  | (0,0) $B_0$ | (1,0) $B_1$ | (0,1) $B_2$ | (1,1) $B_3$ |

FIG. 8

MEMORY SYSTEM FOR VIDEO DECODING SYSTEM

INCORPORATION BY REFERENCE OF RELATED APPLICATIONS

The following U.S. patent applications are related to the present application and are hereby specifically incorporated by reference: patent application Ser. No. 10/114,798, entitled "VIDEO DECODING SYSTEM SUPPORTING MULTIPLE STANDARDS"; patent application Ser. No. 10/114,679, entitled "METHOD OF OPERATING A VIDEO DECODING SYSTEM"; patent application Ser. No. 10/114,797, entitled "METHOD OF COMMUNICATING BETWEEN MODULES IN A DECODING SYSTEM"; patent application Ser. No. 10/114,619, entitled "INVERSE DISCRETE COSINE TRANSFORM SUPPORTING MULTIPLE DECODING PROCESSES"; and patent application Ser. No. 10/113,094, entitled "RISC PROCESSOR SUPPORTING ONE OR MORE UNINTERRUPTIBLE CO-PROCESSORS"; all filed on even date herewith. The following Provisional U.S. Patent Applications are also related to the present application and are hereby specifically incorporated by reference: Provisional Patent Application No. 60/369,144, entitled "VIDEO DECODING SYSTEM HAVING A PROGRAMMABLE VARIABLE LENGTH DECODER"; Provisional Patent Application No. 60/369,014, entitled "PROGRAMMABLE VARIABLE LENGTH DECODER"; Provisional Patent Application No. 60/369,210, entitled "DMA ENGINE HAVING MULTI-LEVEL COMMAND STRUCTURE"; and Provisional Patent Application No. 60/369,217, entitled "INVERSE QUANTIZER SUPPORTING MULTIPLE DECODING PROCESSES"; all filed on even date herewith.

FIELD OF THE INVENTION

The present invention relates generally to media decoding systems, and, more particularly, to a memory system for a decoding system.

BACKGROUND OF THE INVENTION

Digital media decoders decode compressed digital data that represent some form of media in order to reconstruct the media. The present invention relates to efficient on-chip memory utilization for programmable media processors. Such media processors include, but are not limited to, programmable video and/or audio processors. The main functionality of such processors is decoding binary bit-streams conforming to certain coding standards/formats and performing appropriate processing in real time. In the case of video decoding processors, examples of video coding formats are MPEG1, MPEG2, MPEG4, H.263, Microsoft Video 8, RealVideo 8 and the emerging new standard, H.26L. In the case of audio decoding processors, examples of audio coding formats include MPEG layers 1 and 2, Dolby AC-3, MP3, AAC, etc.

A typical programmable media processor contains a microprocessor, a few hardware accelerators and memory. They are communicatively coupled together through an interface of some kind and typically further include means of accessing external memory and a host central processing unit (CPU) as well. The microprocessor typically controls the other modules through issuing appropriate instructions and/or commands. The efficiency of the whole processor depends on how media processing tasks are partitioned and assigned to different modules and how memory is utilized.

A video or audio decoding processing usually involves tasks such as bit-stream syntax parsing, control information/decision calculation, special transformations, filtering, post-processing, etc. For example, in the case of MPEG2 video decoding, syntax parsing includes header information extraction and variable length decoding (VLD). Control information calculation includes motion vector calculation. Special processing includes inverse quantization (IQ) and inverse discrete cosine transformation (IDCT). Filtering comprises motion compensation (MC). Such tasks are usually carried out by different modules in the media processor in a pipelined way. The pipelined operation is efficient and is possible because the media coding is usually based on partitioned picture or audio data. Each media segment is typically represented by a distinct data unit (DU). For example, video coding is based on macroblock (MB) data units, typically of size 16×16. Due to the high complexity and evolving progress of different media coding formats, control information and intermediate data passed along the pipeline would be a bottleneck for efficient execution or infeasible for cost effective design if conventional ways for control information and intermediate data passing were adopted.

In typical decoding methods, the data unit includes two main parts: a header portion containing control data and a data portion containing substantive data. In one conventional method of propagating the controls along the various decoding functions in the pipeline, the controls for the current data unit, e.g., a macroblock in MPEG2 video, are extracted by the microprocessor and then passed to the next decoding function before the microprocessor continues to process the next data unit. Then another decoding element, such as an accelerator, starts processing for this data unit by using the control data latched in registers between the microprocessor and the accelerator, and so on. This scheme is very expensive because there are usually a lot of controls for a media coding format and different coding formats would have different controls. It is inflexible and hard to expand as coding formats evolve because the pipeline is fixed.

In another conventional method of passing data along the pipeline, each decoding module has its own input and output buffers. This is sometimes referred to as a double-buffered scheme. In such a scheme, while one decoding element, such as an accelerator, is producing data to one buffer, another decoding element is reading data from another buffer. Both the intermediate data and controls can be passed this way. Such a system is usually not efficient enough to support multiple media coding formats. For example, in MPEG4 video, after variable-length decoding by a variable-length decoder, further processing for the decoded run/length pairs include run/length decoding (RLD), inverse scan (IS), AC/DC prediction, inverse quantization, inverse discrete cosine transform, motion compensation and deblocking. In one implementation, these tasks are each hardwired as a hardware accelerator. In another implementation, several of them are hardwired into one hardware accelerator. In the former case, many buffers would be needed between the prolonged decoding functions of the pipeline, which results in an expensive design. In the latter case, the system would not be flexible enough to handle different coding formats efficiently and cost-effectively, as various media formats usually require quite different task partitioning and grouping, making it difficult to predetermine the buffer requirement for each accelerator.

The present invention introduces an efficient way to manipulate the control information and data along the pipeline by proper on-chip memory utilization.

Further limitations and disadvantages of conventional and traditional approaches will become apparent to one of skill in the art through comparison of such systems with the present invention as set forth in the remainder of the present application with reference to the drawings.

SUMMARY OF THE INVENTION

One aspect of the present invention is directed to a decoding system for decoding an incoming encoded data stream. The system includes a memory unit and first and second decoding elements. The memory unit has a memory element adapted to store a data unit according to a specified data structure. The specified data structure comprises a header portion containing control data and a data portion containing substantive data. The first decoding element is adapted to receive a data unit stored in the memory element and to perform a first decoding function on the data portion of the received data unit. The second decoding element is adapted to receive a data unit stored in the memory element and to perform a second decoding function on the data portion of the received data unit. The decoding elements perform their decoding function according to at least one parameter stored in the header portion of the received data unit.

Another embodiment of the present invention is directed to a method of decoding an encoded data unit. Pursuant to the method, the data unit is stored in a memory element. A first decoding function is performed on the data unit stored in the memory element to produce a first set of processed data. The first set of processed data is stored in the memory element. Then, a second decoding function is performed on the first set of processed data, which is stored in the memory element, to produce a second set of processed data. The second set of processed data is stored in the memory element.

Another embodiment of the present invention is directed to a method of decoding an encoded digital data stream with a decoding system. Pursuant to the method, a first data unit of the data stream is stored in a first memory element. Then a first stage is executed, in which a first decoding function is performed on the first data unit stored in the first memory element and the resulting processed data is stored in the first memory element. Also in the first stage, a second data unit of the data stream is stored in a second memory element. A second stage is then executed, wherein the first decoding function is performed on the second data unit stored in the second memory element and the resulting processed data is stored in the second memory element. Also in the second stage, a second decoding function is performed on the processed data stored in the first memory element and the resulting processed data is stored in the first memory element. Additionally in the second stage, a third data unit of the data stream is stored in a third memory element.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 6 is a diagram illustrating the macroblock structure of one frame of a video sequence.

FIG. 7a is a chart representing a single-row decoding pipeline according to an illustrative embodiment of the present invention.

FIG. 7b is a chart representing a single-row decoding pipeline according to an illustrative embodiment of the present invention.

FIG. 8 is a chart representing a dual-row decoding pipeline according to an illustrative embodiment of the present invention.

DETAILED DESCRIPTION

Figure 1:
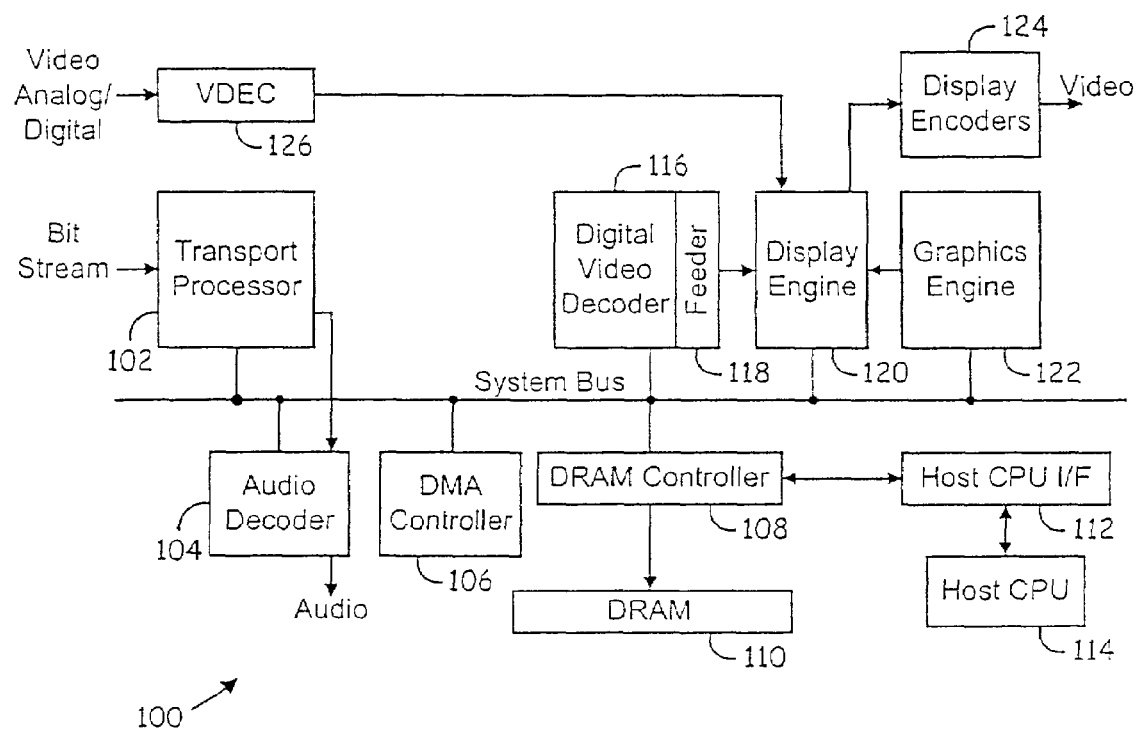
FIG. 1 is a functional block diagram of a digital media system in which the present invention may be illustratively employed.

The present invention forms an integral part of a complete digital media system and provides flexible decoding resources. FIG. 1 is a functional block diagram of a digital media system in which the present invention may be illustratively employed. It will be noted, however, that the present invention can be employed in systems of widely varying architectures and widely varying designs.

The digital media system of FIG. 1 includes transport processor 102, audio decoder 104, direct memory access (DMA) controller 106, system memory controller 108, system memory 110, host CPU interface 112, host CPU 114, digital video decoder 116, display feeder 118, display engine 120, graphics engine 122, display encoders 124 and analog video decoder 126. The transport processor 102 receives and processes a digital media data stream. The transport processor 102 provides the audio portion of the data stream to the audio decoder 104 and provides the video portion of the data stream to the digital video decoder 116. In one embodiment, the audio and video data is stored in main memory 110 prior to being provided to the audio decoder 104 and the digital video decoder 116. The audio decoder 104 receives the audio data stream and produces a decoded audio signal. DMA controller 106 controls data transfer amongst main memory 110 and memory units contained in elements such as the audio decoder 104 and the digital video decoder 116. The system memory controller 108 controls data transfer to and from system memory 110. In an illustrative embodiment, system memory 110 is a dynamic random access memory (DRAM) unit. The digital video decoder 116 receives the video data stream, decodes the video data and provides the decoded data to the display engine 120 via the display feeder 118. The analog video decoder 126 digitizes and decodes an analog video signal (NTSC or PAL) and provides the decoded data to the display engine 120. The graphics engine 122 processes graphics data in the data stream and provides the processed graphics data to the display engine 120. The display engine 120 prepares decoded video and graphics data for display and provides the data to display encoders 124, which provide an encoded video signal to a display device.

Aspects of an illustrative embodiment of the present invention relate to the architecture of digital video decoder 116. However aspects of the present invention can also be employed in decoders of other types of media, for example, audio decoder 104.

Figure 2:
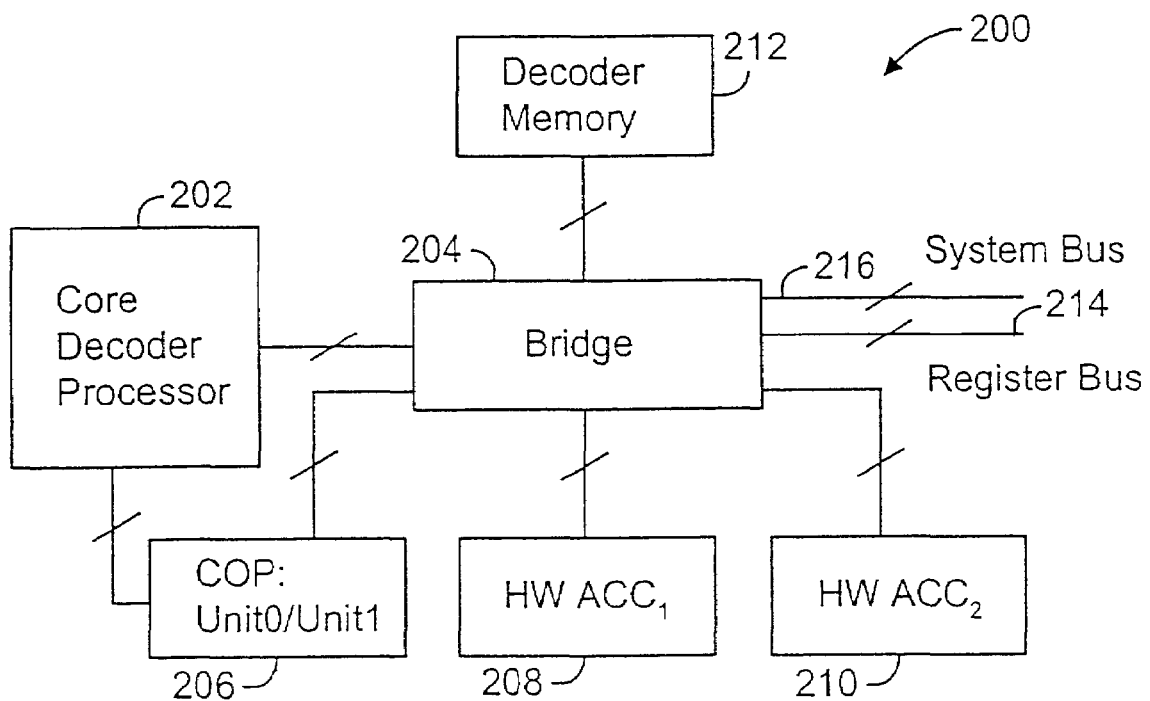
FIG. 2 is a functional block diagram of a decoding system according to an illustrative embodiment of the present invention.
Figure 3:
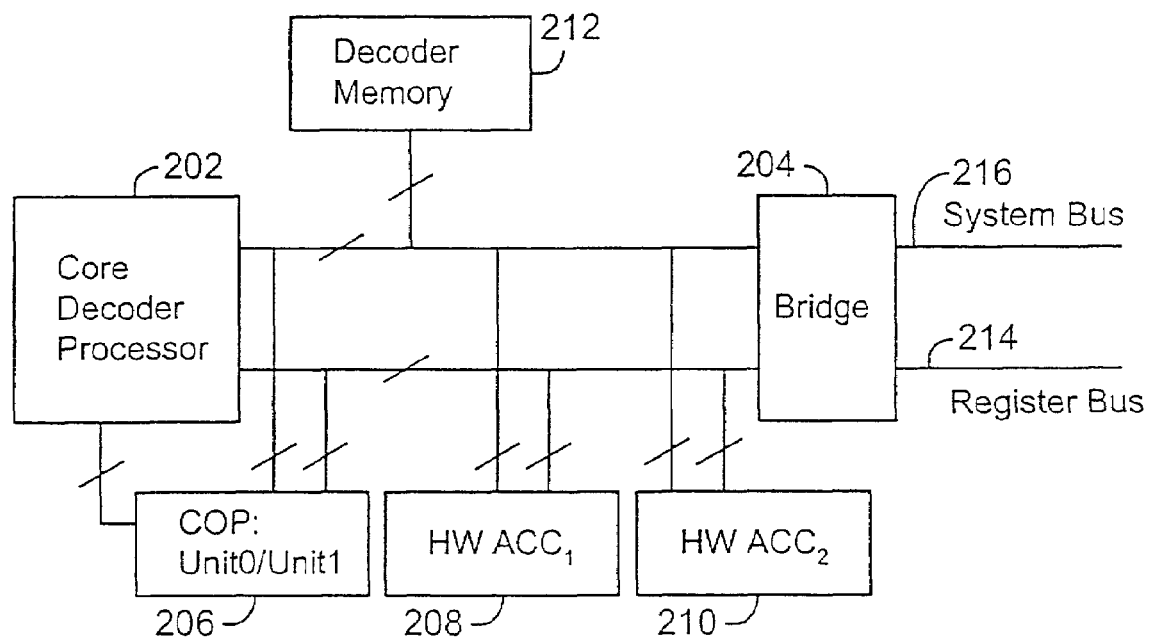
FIG. 3 is a functional block diagram of a decoding system according to an illustrative embodiment of the present invention.

FIG. 2 is a functional block diagram of a media decoding system 200 according to an illustrative embodiment of the present invention. The digital media decoding system 200 of FIG. 2 can illustratively be employed to implement the digital video decoder 116 of FIG. 1, or, alternatively, to implement audio decoder 104. Decoding system 200 includes a core decoder microprocessor 202, bridge module 204, co-processor 206, two hardware accelerators 208 and 210, decoder memory module 212, register bus 214 and system bus 216. Register bus 214 and system bus 216 communicate with the external host 114 and main memory 110. In an illustrative embodiment, the co-processor comprises two independent and identical units. In an illustrative embodiment, the bridge module 204 is a "switch center" to arbitrate and interface between different modules. The bridge module illustratively includes direct memory access (DMA) functionality. In an alternative embodiment, the bridge module 204 operates such that buses connect different modules directly, as shown in FIG. 3.

The acceleration modules 208 and 210 are hardware accelerators that accelerate special decoding tasks that would otherwise be bottlenecks for real-time media decoding if these tasks were handled by the core processor 202 alone. This helps the core processor 202 achieve the required performance. In an illustrative embodiment, the co-processor 206 is also a hardware accelerator that communicates with the core processor 202 via a co-processor interface of the core processor 202. In an illustrative embodiment wherein the decoding system 200 is a video decoding system, the co-processor 206 is a variable-length decoder and the acceleration modules perform one or more video decoding tasks such as inverse quantization, inverse discrete cosine transformation, pixel filtering, motion compensation and deblocking. The system of FIGS. 2 and 3 are illustrative only. In accordance with the present invention, the decoding system 200 can have any number of hardware accelerators.

The core processor 202 is the central control unit of the decoding system 200. In an illustrative embodiment of the present invention, the co-processor unit 206 assists the core processor 202 in decoding the bitstream to prepare the data unit for further processing. Each data unit illustratively includes a header portion containing control data and a data portion containing substantive data. In an embodiment wherein the data being decoded is video data, the data portion of the data unit comprises macroblock coefficient data. After the control information and data for each data unit are extracted, the core processor 202 and co-processor 206 illustratively deposit the appropriate control information and data in decoder memory 212. In an illustrative embodiment of the present invention, the core processor 202 derives the data units from the bitstream to be decoded. The core processor 202 extracts the control information and data for each data unit and deposits the data unit in decoder memory 212. In an alternative embodiment, the core processor 202 provides the processed control information and data directly to the co-processor 206 for processing by the co-processor 206. In this alternative embodiment, the co-processor 206 then deposits the appropriate control information and data in decoder memory 212 after processing the control information and data. The core processor 202 also orchestrates a data unit processing pipeline (such as a macroblock processing pipeline) for the acceleration modules 206, 208 and 210 and fetches the required data from main memory 110 via the bridge module 204. The core processor 202 also handles some data processing tasks. Where decoding system 200 is a video decoding system, picture level processing, including sequence headers, GOP headers, picture headers, time stamps, macroblock-level information except the block coefficients, and buffer management, are typically performed directly and sequentially by the core processor 202, without using the accelerators 206, 208, 210, except for using a variable-length decoder 206 to accelerate general bitstream parsing. In an illustrative embodiment of the present invention, the core processor 202 is a MIPS processor, such as a MIPS32 implementation, for example.

In an embodiment of the present invention wherein the co-processor 206 is a variable-length decoder, the co-processor 206 retrieves coded data from main system memory (DRAM) 110. The core processor 202 gets the header information from, and via, the co-processor 206. The co-processor 206 then place some data, typically partially processed data, in decoder memory 212.

The data (such as transform coefficients) deposited in decoder memory 212 by the coprocessor 206 are processed by hardware accelerator module 208 according to one or more parameters contained in the header portion of the data unit being processed. After processing the data, hardware accelerator 208 deposits the processed data in decoder memory 212.

The data deposited in decoder memory 212 by hardware accelerator 208 are processed by hardware accelerator module 210 according to one or more parameters contained in the header portion of the data unit being processed. After processing the data, hardware accelerator 210 deposits the processed data in decoder memory 212.

The bridge module 204 arbitrates and moves data between decoder memory 212 and main memory 110. The bridge interface 204 illustratively includes an internal bus network that includes arbiters and a direct memory access (DMA) engine. The bridge module 204 serves as an asynchronous interface to the system buses.

Decoder memory 212 is used to store data unit data and other time-critical data used during the decoding process. Each hardware block 206, 208, 210 accesses decoder memory 212 to either read the data to be processed or write processed data back. In an illustrative embodiment of the present invention, all currently used data is stored in decoder memory 212 or the caches of the core processor 202 to minimize access to main memory. The co-processor 206 and hardware accelerators 208 and 210 typically use the decoder memory 212 as the source and destination memory for their normal operation. Each module accesses the data in decoder memory 212 as the data units (such as macroblock data units) are processed through the system. In an exemplary embodiment, decoder memory 212 also includes parameter buffers that are adapted to hold parameters that are needed by the hardware modules to do their job at a later decoding pipeline stage. The buffer addresses are passed to the hardware modules by the core processor 202. In an illustrative embodiment, decoder memory 212 is a static random access memory (SRAM) unit. The host CPU 114 has access to decoder memory 212, and the bridge module 204 can transfer data between decoder memory 212 and the main system memory (DRAM) 110. The arbiter for decoder memory 212 is in the bridge module 204.

Figure 4:
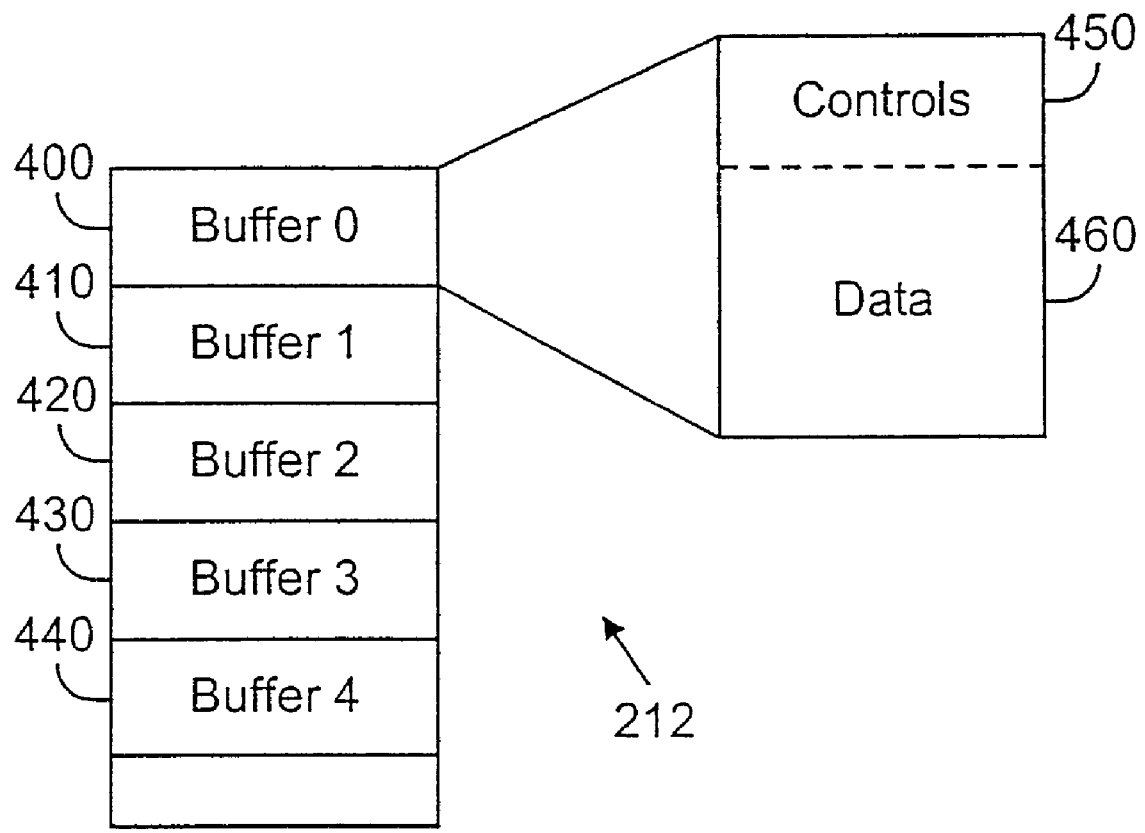
FIG. 4 is a functional block diagram depicting a structure of a decoder memory element according to an illustrative embodiment of the present invention.

To cope with the high complexity of various media coding formats and evolving media coding technology, the present invention presents a new way of handling the control information and processed data of the data units being decoded. According to an illustrative embodiment of the present invention, decoder memory 212 is partitioned into a certain number of data unit buffers as illustrated in the functional block diagram of FIG. 4. The number of buffers is determined by the number of pipelined decoding functions needed for the processing of a data unit. Different media coding formats can have different numbers of pipelined decoding functions. In an illustrative embodiment of the present invention, the number of pipelined decoding functions and the number of data unit buffers to be employed in decoder memory 212 is controlled by the firmware. The illustrative embodiment of FIG. 4 contains five data unit buffers: buffer 0 (400), buffer 1 (410), buffer 2 (420), buffer 3 (430) and buffer 4 (440). Each buffer comprises a header portion 450 and a data portion 460. The header portion 450 holds the control information that is contained in the header of a data unit. The data portion 460 holds the substantive data of the data unit. The control information includes parameters that dictate how the substantive data is to be decoded. The content of the control information in the header of a data unit will vary according to the encoding/decoding standard used to encode the data. The size of each buffer is determined by the requirements of the various coding formats. For video coding formats that are based on macroblock data units, the size of the buffers may be reasonably small. In the case of video processors, the size of 1184 bytes is found to be enough for one buffer for existing known media coding formats and to leave some reserved space for future expansion.

According to an illustrative embodiment of the present invention, each incoming data unit to be decoded is assigned one of the data unit buffers. The header portion and the data portion of the data unit are initially stored in the buffer assigned to that data unit. In an alternative embodiment, the first time the data is stored in the buffer is after the first stage of processing by the core processor 202 and the co-processor 206. This saves an unnecessary step of copying the data from system DRAM 110 to decoder memory 212, when the data is just going to be read again. In this alternative embodiment, the co-processor 206 provides the function of reading the incoming data from the system DRAM 110, for use by either the core decoder processor 202 or by the co-processor 206 itself. In each stage of the decoding pipeline, the data portion, or the intermediate data, of the data unit is retrieved from its assigned buffer by one of the decoding elements (such as decoding elements 206, 208 and 210) and processed by that decoding element. The newly processed data is then deposited back in the data portion 460 of the assigned buffer by the decoding element. In an illustrative embodiment of the present invention, the newly processed data replaces the previous substantive data in the data portion 460 of the buffer (i.e., the data retrieved by the decoding element for processing). In an alternative embodiment, the newly processed data is stored in the data portion 460 of the buffer together with the previous substantive data. Each buffer only contains the control information and processed data for a data unit during the data unit's life cycle, which is from the time the core processor 202 starts processing for that data unit to the time the last task for that data unit is finished by the last decoding module to process the data unite. Then the buffer is recycled and made available for further data unit processing for another data unit in the incoming data stream. This data unit memory scheme will be referred to herein as an in-place memory system.

The control information of a data unit is written to the header portion 450 of the assigned buffer after it is extracted from the bitstream by the core processor 202. The control information stored in the buffer is then used by the different hardware modules for processing of the data unit at different pipeline stages. Thus, the control information for a given data unit are written only once to decoder memory 212 instead of being latched between different pipeline stages (which is very costly) or inefficiently propagated from one buffer to another. The control data, for a given data unit, stored in the header portion 450 of the assigned buffer normally remains constant throughout the decoding of that data unit. It is not modified unless a specific algorithm and embodiment include additional processing of the header information. In an illustrative embodiment, the descriptors for the controls are designed to handle all existing media formats and can be expanded for emerging new media formats.

Data generated by a module (say, co-processor 206) for a given data unit are stored in the data portion of the assigned buffer (say, buffer 0 (400)). This data will be used by another module (say, hardware accelerator 208) at the next pipeline stage. Hardware accelerator 208 reads the data from buffer 0 (400) and processes the data according to the control information stored in the control portion of buffer 0 (400). Hardware module 208 then writes the newly processed data back to the same buffer 0 (400). In the meantime, co-processor 206 has been working on the data for another data unit and would write the processed data t6 a different buffer, which is assigned to this new data unit (say, buffer 1 (410)).

Figure 5:
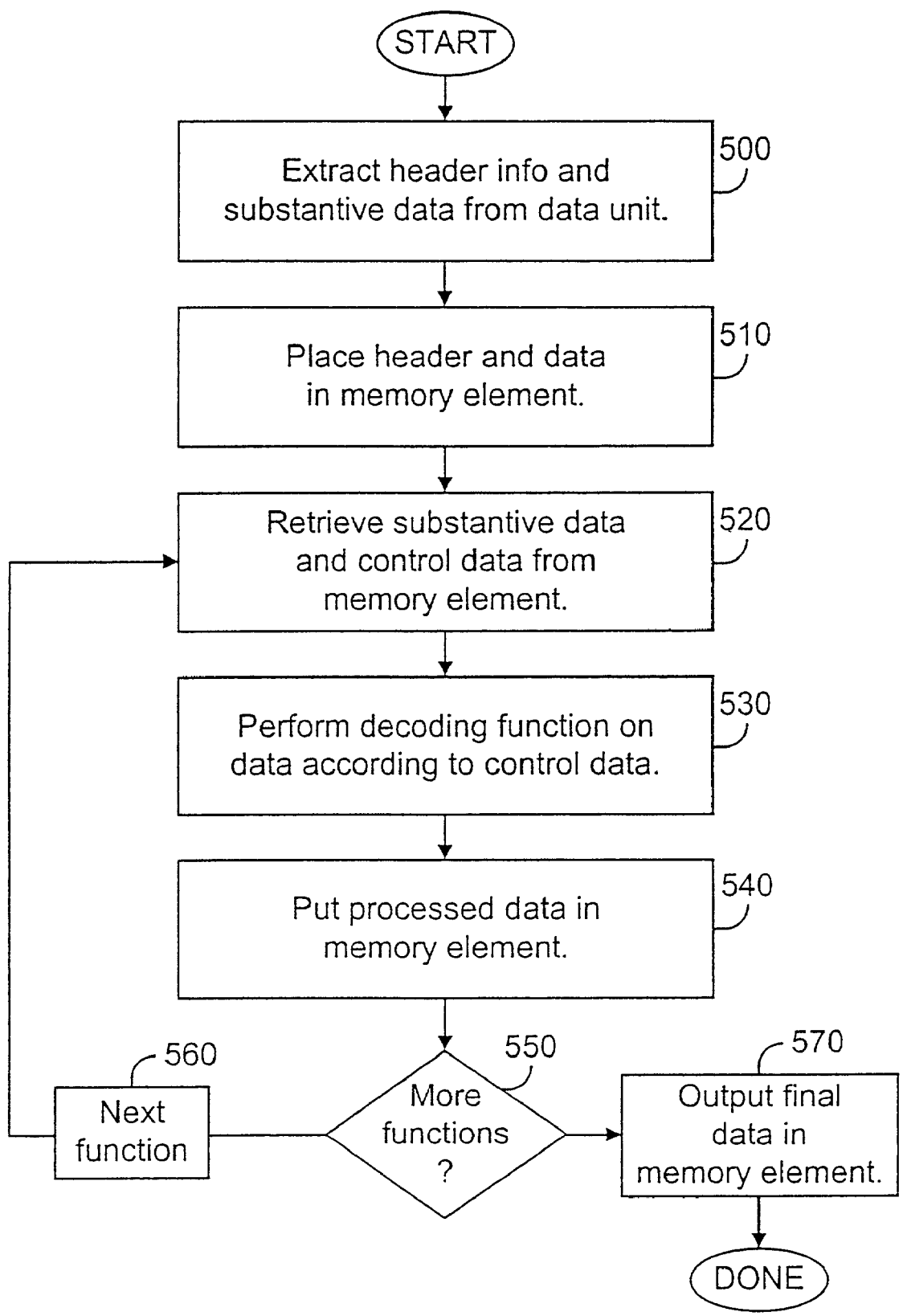
FIG. 5 is a flow chart representing a method of decoding a data unit according to an illustrative embodiment of the present invention.

FIG. 5 is a flow chart representing a method of decoding a data unit according to an illustrative embodiment of the present invention. At step 500, the header information and the substantive data to be decoded are extracted from the bitstream and processed appropriately. At step 510, the control data from the header and the substantive data are stored in an assigned memory element (such as buffer 0 (400)). At step 520, the control data and substantive data are retrieved from the memory element. At step 530, a specified decoding function is performed on the retrieved substantive data, using at least one operating parameter dictated by the control data. At step 540, the processed data resulting from the decoding function is stored in the memory element. At decision box 550, it is determined whether there are more decoding functions to be performed with respect to the data unit. If there are, the next function is invoked, as indicated by block 560, and the control data and substantive data are retrieved from the memory element for decoding by the next function, as shown indicated at step 520. The substantive data retrieved is the processed data that was placed in the memory element by the prior decoding function. This process continues as long as there are further decoding functions to be performed with respect to the data unit. When there are no more decoding functions to be performed with respect to the data unit, the final form of the substantive data in the memory element are output to, for example, a display module 120 or system memory 110, as indicated by step 570. In an alternative embodiment of the present invention, the final result of the processing is not written back to the decoder memory 212, but rather is sent out to the system memory 110.

The in-place memory scheme of data unit management described above with respect to FIGS. 4 and 5 solves the inefficiency and inflexibility in the aforementioned conventional ways of data handling, such as latching controls or prolonged double-buffering, when used in programmable media processors. It avoids the need for maintaining a lot of buffers between the pipeline stages and ensures flexibility of the pipeline design and control. For example, in MPEG4 video decoding, after variable-length decoding is done by co-processor 206, the resulting (run, length) pairs typically further go through run/length decoding, inverse scan, AC/DC prediction, inverse quantization, inverse discrete cosine transform, motion compensation and deblocking. With the data unit management scheme of the present invention, the AC/DC prediction, a task that is not common to all coding formats, can be performed by software or firmware and can be combined into the decoding pipeline without making the pipeline control more complex, rather than performing AC/DC prediction with a dedicated hard-wired accelerator or a prolonged pipeline scheme. This is readily achieved since the intermediate data are stored in the designated buffer, to which the core processor 202 has access. Also, the data unit management scheme of the present invention is more efficient and cost effective compared to the double-buffered prior art method, and more flexible compared to the latching-data prior art method.

Figure 6:
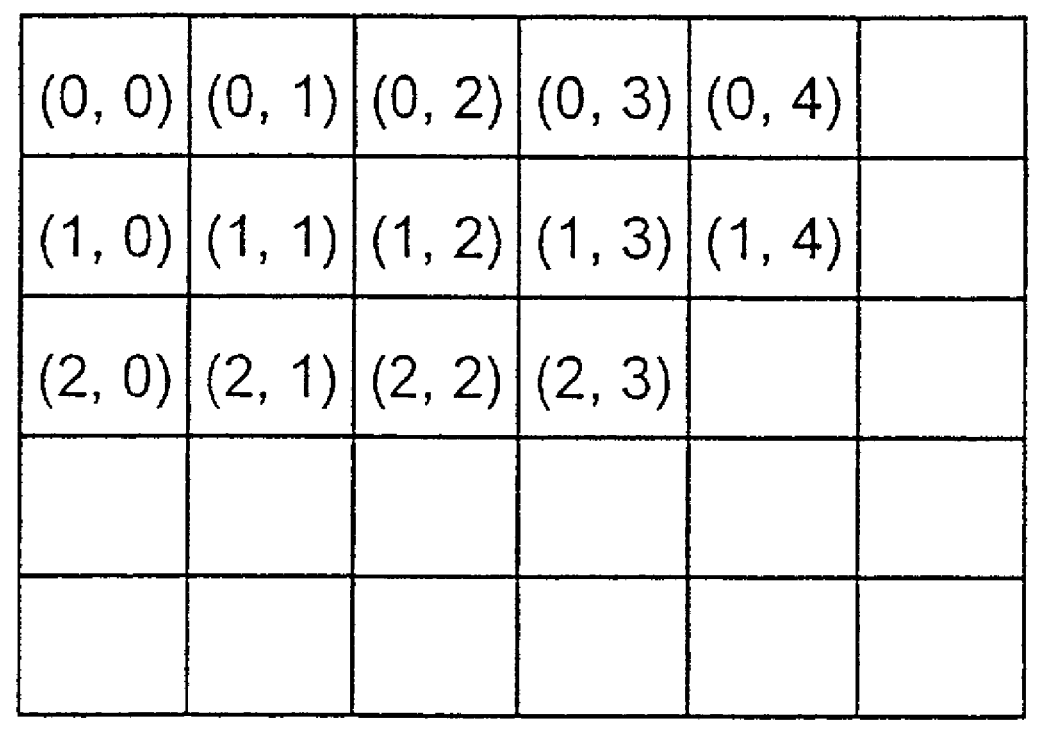

As mentioned previously, in an illustrative embodiment of the present invention, the core processor 202 operates in a pipelined way and the pipeline stages are based on the processing for the data units. As used in the present application, the term "stage" can refer to all of the decoding functions performed during a given time slot, or it can refer to a functional step, or group of functional steps, in the decoding process. Media coding formats are typically based on partitioned data units. For example, a picture in a video sequence is partitioned into macroblocks of 16×16 pixels, as shown in the diagram of FIG. 6, for the cases of MPEG1, MPEG2, MPEG4, H.26L, etc. FIG. 6 illustrates the macroblock structure of one frame 600 of a video sequence. In FIG. 6, the macroblocks are labeled by the row and column numbers. Thus (m,n) indicates the $n^{th}$ macroblock in the $m^{th}$ macroblock row.

For purposes of illustration, assume the media processor shown in FIG. 2 or FIG. 3 is designed to decode the bitstream for the encoded picture 600 shown in FIG. 6 and each of the macroblocks needs to go through the processing performed by core processor 202, co-processor 206, hardware accelerator 208 and hardware accelerator 210. FIG. 7a is a chart representing a single-row decoding pipeline according to an illustrative embodiment of the present invention. In FIG. 7a, the core processor 202 decodes the macroblock header without the help of the coprocessor 206 and the processing task assumed by co-processor 206 is arranged at a different pipeline stage from 202. In the single-row decoding pipeline scheme illustrated in FIG. 7a, the macroblocks are processed block by block from left to right and row by row from top to bottom. In FIG. 7a, the designation (m,n) indicates the macroblock data unit for which the corresponding module is processing data. The designation $B_i$ indicates the buffer in decoder memory 212 that is assigned to store the control information and processed data for the corresponding data unit (macroblock, in this example). That is, $B_i$ indicates the buffer from which the decoding element retrieves the data to be processed and the buffer in which the processed data is deposited after processing. The rows of FIG. 7a represent the decoding elements: core processor 202, coprocessor 206, hardware accelerator 208, hardware accelerator 210 and bridge module 204. The columns of FIG. 7a represent the pipeline stages. The pipeline scheme supports one pipeline stage per module, wherein any hardware module that depends on the result of another module is arranged in a following macroblock pipeline stage.

The pipeline starts at the core processor 202 and any successive stage relies only on the data generated in previous stages. The control information for the current data unit is generated by the core processor 202. At any given stage in the pipeline, while a given function is being performed on a given macroblock, the next macroblock in the data stream is being worked on by the previous function [or previous stage] in the pipeline. For ease of illustration, the following discussion assumes a pipeline where all the processing for a data unit is done by core processor 202, co-processor 206, hardware accelerator 208, hardware accelerator 210 and bridge modules 204, respectively, in five pipeline stages. It will be appreciated, however, that the pipeline scheme and the data unit management scheme is implementable with any number of decoding elements and any number of data unit buffers. The number of decoding functions in the pipeline may vary depending on the target applications and the number of decoding functions.

In the first pipeline stage 700, the core processor 202 extracts the control information from the header, and the data from the data portion, of macroblock (0,0). Note that in an alternative embodiment of the present invention, the co-processor 206 assists the core processor 202 in decoding the macroblock header, as described below with respect to FIG. 7b. But for the purposes of illustration of the data unit management of the present invention, in the embodiment illustrated in FIG. 7a, the core processor 202 decodes the macroblock header without the help of the co-processor 206. In stage one 700, the core processor 202 also performs necessary calculations and makes appropriate decisions. The core processor stores the extracted control information in the header portion 450 of buffer 0 (400) and stores the extracted substantive data in the data portion 460 of buffer 0 (400). In an illustrative embodiment, the substantive data comprises macroblock coefficients.

In the second pipeline stage 710, the co-processor 206 starts reading and working on the data stored in the data portion of buffer 0 (400) after receiving a start command from the core processor 202. Note that the data stored in buffer 0 (400) was deposited there in stage one 700. The control information stored in the header portion 450 of buffer 0 (400) is used by the coprocessor 206 to dictate processing parameters to be used during stage two 710. The newly processed data is stored back to the data portion 460 of buffer 0 (400). Meanwhile, also during stage two 710, the core processor 202 starts work on macroblock (0,1) and stores the control information and data for macroblock (0,1) in the header portion 450 and data portion 460 of buffer 1 (410).

In the third pipeline stage 720, hardware accelerator 208 performs its decoding function(s) for macroblock (0,0) after receiving instructions from the core processor 202. The data that hardware accelerator 208 works on during this stage is the data in the data portion 460 of buffer 0 (400), which is the data that was placed in buffer 0 (400) by the co-processor 206 in stage two 710. Hardware accelerator 208 reads the control data and the substantive data from buffer 0 (400), processes the substantive data, and stores the newly processed data back to the data area 460 of buffer 0 (400). In the mean time, the co-processor 206 works on macroblock (0,1), reading the control data and substantive data from buffer 1 (410) and storing the processed data back to the data portion 460 of buffer 1 (410). Also, during stage three 720, the core processor 202 works on macroblock (0, 2) and stores the controls and data in the header portion 450 and data portion 460 of buffer 2 (420) respectively.

In the fourth stage 730, hardware accelerator 210 works on macroblock (0,0). Hardware accelerator 210 reads the macroblock header data from the header portion 450 of buffer 0 (400) and reads the data to be processed from the data portion 460 of buffer 0 (400), where hardware accelerator 208 deposited its processed data in stage three 720. Hardware accelerator 210 processes the data according to the parameters contained in the header data and stores the processed data back in buffer 0 (400). Also during stage four 730, hardware accelerator 208 works on macroblock (0,1), retrieving the substantive data and control data from buffer 1 (410), processing the data according to the header data, and depositing the resulting processed data in the data portion 460 of buffer 1 (410). The co-processor 206 works on macroblock (0,2), retrieving the substantive data and control data from buffer 2 (420), processing the data according to the header data, and depositing the resulting processed data in the data portion 460 of buffer 2 (420). The core processor 202 works on macroblock (0,3) and deposits the extracted header information in the header portion 450 of buffer 3 (430) and the extracted coefficient data in the data portion 460 of buffer 3 (430). At the end of this stage, the processing for macroblock (0,0) is complete. The final decoded data is stored back in buffer 0 (400), waiting to be output via the bridge/DMA module 204 to, for example, external memory 110 or display engine 120. In an alternative embodiment of the present invention, the final result (the product of the last decoding function in the pipeline, here, hardware accelerator 210) is written to main memory 110 (or alternatively to display engine 120) and not written back to the decoder memory.

In the fifth stage 740, the bridge/DMA module 204 transfers the data in buffer 0 (400) to its destination, which could be the main memory 110 in one embodiment, or the display engine 120 in another embodiment. In one embodiment of the present invention, the bridge/DMA module 204 provides the final decoded data to system memory 110. In an alternative embodiment, the decoded data is provided to display engine 120. Also in stage five 740, hardware accelerator 210 does its job on macroblock (0,1), retrieving the substantive data and control data from buffer 1 (410), processing the data according to the header data, and depositing the resulting processed data in the data portion 460 of buffer 1 (410). Hardware accelerator 208 performs its decoding function(s) for macroblock (0,2), retrieving the substantive data and control data from buffer 2 (420) and depositing the resulting processed data back in the data portion 460 of buffer 2 (420). The co-processor 206 processes macroblock (0,3) data, retrieving the data from buffer 3 (430) and depositing the processed data in the data portion 460 of buffer 3 (430). The core processor 202 works on macroblock (0,4) and deposits the extracted header information in the header portion 450 of buffer 4 (440) and the extracted coefficient data in the data portion 460 of buffer 4 (440).

In the sixth stage 750, buffer 0 (400) is free since the data it had been holding, the data for macroblock (0,0), was dispensed as output in stage five 740. In stage six 750, the core processor works on the next macroblock data element in the data stream, macroblock (0,5). The core processor 202 stores the controls and data in the header portion 450 and data portion 460 of buffer 0 (400) respectively. Also in stage six 750, the other modules 206, 208 and 210 advance to the processing for their corresponding next macroblock data units. This decoding pipeline continues in this manner as long as there is macroblock data in the incoming bitstream to be decoded.

In the illustrative decoding pipeline of FIG. 7*a*, a total of five buffers in decoder memory 212 are used for the pipelined media processing. Information and storage are shared among different modules and stages.

FIG. 7*b* is a chart representing a single-row decoding pipeline according to an illustrative embodiment of the present invention. In FIG. 71*b* the core processor 202 needs the help of the coprocessor 206 to extract the control information and/or data and the task of the co-processor 206 is arranged in the same pipeline stage as the core processor 202. Otherwise, the pipeline of FIG. 7*b* proceeds in a manner similar to the pipeline of FIG. 7*a*. In the illustrative decoding pipeline of FIG. 7*b*, a total of four buffers in decoder memory 212 are used for the pipelined media processing.

In some cases, the core processor 202 needs to interact with some intermediate macroblock data (i.e., substantive data that has been processed by at least one, but not all, of the decoding modules) from a module, as in the previously mentioned example of MPEG4 AC/DC prediction. The in-place memory scheme of the present invention allows software/firmware to perform the AC/DC prediction. This is easily achievable since the intermediate data are stored in the designated buffer and accessible by the core processor 202.

The main video decoding operations occur within a direct execution loop wherein the core processor polls the accelerator functions for completion of their assigned tasks. The coprocessor 206 and accelerators 208 and 210 operate concurrently with the core processor while decoding a series of macroblocks. The core processor 202 controls the pipeline, initiates the decoding of each macroblock, and controls the operation of each of the accelerators. Upon completion of each macroblock processing stage in the core processor 202, firmware checks the status of each of the accelerators to determine completion of previously assigned tasks. In the event that the firmware gets to this point before an accelerator module has completed its required tasks, the firmware polls for completion. When the core processor 202 and all of the hardware accelerators have completed their functions with respect to the present macroblocks, the core processor initiates the next stage of the pipeline by instructing all of the accelerators to begin operating on the next macroblock in the pipeline. This is appropriate, since the pipeline does not proceed efficiently until all of the pipeline elements have completed the current stage, and an interrupt driven scheme would be less efficient for this purpose.

Each hardware module 206, 208, 210 is independently controllable by the core processor 202. The core processor 202 drives a hardware module by issuing a certain start command after checking the module's status. In one embodiment, the core processor 202 issues the start command by setting a register in the hardware module.

In an alternative embodiment of the present invention, the tasks of the core processor 202 are partitioned into two major tasks. The first task is to extract the header information from a given data unit. In an illustrative embodiment of the present invention, the co-processor 206 assists the core processor 202 in extracting the header information. The second main task of the core processor 202 is to do more calculations to form appropriate controls for other modules to use in later stages. For example, in an illustrative embodiment wherein the decoding system 200 is a video decoding system, the core processor 202 reconstructs motion vectors, calculates the addresses of pixel filter reference fetches, performs pipeline flow control and checks the status of the decoding modules. When the header information for a given data unit is extracted by the core processor 202 in a given stage, the co-processor 206 begins performing its decoding functions on the same data unit, without waiting for the start of the next stage, i.e., without waiting for the core processor 202 to complete all of its calculations with respect to the given data unit. For example, in an embodiment wherein the co-processor 206 is a variable-length decoder, the variable-length decoder assists the core processor 202 with decoding the header of a data unit. When the header is decoded, the variable-length decoder 206 begins decoding the coefficients of the data unit, without waiting for the start of the next stage i.e., without waiting for the core processor 202 to complete all of its calculations with respect to the given data unit. The two main tasks of the core processor 202 are partitioned such that the first task will be finished by the core processor 202 as soon as possible so that the co-processor 206 can begin performing its functions as quickly as possible.

As mentioned previously, in an illustrative embodiment of the present invention, the coprocessor 206 comprises two distinct units. In an illustrative embodiment of the present invention, both units (unit A and unit B) are simultaneously involved in the decoding process. For example, in an embodiment wherein the decoding system 200 is a video decoding system, two macroblock rows of a video frame are decoded simultaneously, with one row being operated on by unit A of the co-processor 206 and the other being decoded by unit B. Since many media coding formats code the data units row by row without any interaction between rows, two rows of the data units can be processed simultaneously. Such coding format examples include MPEG1 and MPEG2. The rows are decoded in an alternating manner, with a macroblock from row X being operated on by unit A in one stage, a macroblock from one row Y being operated on by unit B in the next stage, and so on. This decoding scheme will be referred to herein as dual-row decoding. In dual row decoding, each unit of the co-processor 206 is allowed two pipeline stages to do and finish its block coefficients decoding job. One unit of the co-processor 206 is allowed to perform and finish its operations with respect to a given macroblock in a given row in its second allotted pipeline stage, during which the core processor 202 and the other co-processor unit begin working on a macroblock in another row. In this manner, the co-processor 206 is less likely to be the bottleneck in the decoding pipeline. This can increase the efficiency of the decoding pipeline since the co-processor 206 may be the bottleneck for some data formats in a pipeline employing only one co-processor 206.

According to the present invention, the dual-row decoding scheme utilizes the in-place memory scheme described above with respect to FIGS. 4–7. For purposes of illustration, assume the media processor shown in FIG. 2 or FIG. 3 is designed to decode the bitstream for the encoded picture 600 shown in FIG. 6 (in certain formats) and each of the macroblocks needs to go through the processing performed by core processor 202, co-processor unit A 205, coprocessor unit B 207, hardware accelerator 208 and hardware accelerator 210. FIG. 8 is a chart representing a dual-row decoding pipeline according to an illustrative embodiment of the present invention.

In the first pipeline stage 800, the core processor extracts just enough information for macroblock (0,0) so that the co-processor unit A 205 can begin operating on macroblock (0,0) on time. The core processor 202 goes on to process more information and form the controls to be used by other modules, and stores the information to buffer 0 (400). When co-processor unit A 205 receives the start command from the core processor 202, unit A 205 starts its processing of macroblock (0,0). Co-processor unit A 205 doesn't have to finish its operations on macroblock (0,0) within this stage. It could last into the second stage 810 as explained below.

When the core processor 202 completes its functions with respect to macroblock (0,0), it initiates the second pipeline stage 810, regardless of whether co-processor unit A 205 has completed its processing of macroblock (0,0). In pipeline stage two 810, the core processor 202 starts the processing of macroblock (1,0), the first data unit in the second row of the video frame 600. The core processor 202 extracts just enough information for macroblock (1,0) so that the co-processor 206 can begin operating on macroblock (1,0) and then issues commands to the coprocessor 206 causing co-processor unit B 207 to begin processing macroblock (1,0). The core processor 202 then goes on to process more information regarding macroblock (1,0) and to form the controls to be used by other modules in the decoding of macroblock (1,0). The core processor 202 stores the extracted control data in buffer 1 (410). Co-processor unit B 207 doesn't have to finish its operations on macroblock (1,0) within stage two 810. It can continue working on macroblock (1,0) into the third stage 820, as explained below. Also during stage two 810, unit A 205 of co-processor 206 continues and finishes its processing of macroblock (0,0) (assuming that co-processor unit A 205 did not complete its processing of macroblock (0,0) in stage one 800). The newly produced data is stored back in the data area 460 of buffer 0 (400).

When the core processor 202 has completed its functions with respect to macroblock (1,0) and co-processor unit A 205 has completed its work on macroblock (0,0), the core processor 202 initiates the third pipeline stage 820, regardless of whether co-processor unit B 207 has completed its processing of macroblock (1,0). In pipeline stage three 820, the core processor 202 starts the processing of macroblock (0,1), the second data unit in the first row of the video frame 600. When the core processor 202 has extracted enough information for macroblock (0,1) so that the co-processor 206 can begin operating on macroblock (0,1), the core processor issues a start command to the co-processor 206 causing co-processor unit A 205 to begin processing macroblock (0,1). The core processor 202 then performs other operations with respect to macroblock (0,1), including extracting the control data to be used by other modules in the decoding of macroblock (0,1). The core processor 202 stores the extracted control data in the control portion 450 of buffer 2 (420). Co-processor unit A 205 doesn't have to finish its operations on macroblock (0,1) within stage three 820. It can continue working on macroblock (0,1) into the fourth stage 830, as explained below. Also during stage three 820, unit B 207 of co-processor 206 continues and finishes its processing of macroblock (1,0) (assuming that coprocessor unit B 207 did not complete its processing of macroblock (1,0) in stage two 810). The newly produced data is stored in the data area 460 of buffer 1 (410).

Also in stage three 820, hardware accelerator 208 performs its decoding function(s) with respect to macroblock (0,0). Hardware accelerator 208 reads control data from the control portion 450 of buffer 0 (400) and substantive data from the data portion 460 of buffer 0 460. Note that the data in buffer 0 (400) was placed there by co-processor unit A 205 in stage two 810. Hardware accelerator 208 processes the substantive data using control parameters read from the header portion 450 of buffer 0 (400) and stores the newly processed data back in the data area 460 of buffer 0 (400).

When the core processor 202 has completed its functions with respect to macroblock (0,1), co-processor unit B 207 has completed its work on macroblock (1,0) and hardware accelerator 208 has completed its processing of macroblock (0,0), the core processor 202 initiates the fourth pipeline stage 830, regardless of whether co-processor unit A 205 has completed its processing of macroblock (0,1). In stage four 830, the core processor 202 starts the processing of macroblock (1,1). When the core processor 202 has extracted enough control information, co-processor unit B 207 begins processing macroblock (1,1). The core processor 202 then performs other operations with respect to macroblock (1,1), including extracting the control data to be used by other modules in the decoding of macroblock (1,1). The core processor 202 stores the extracted control data in the control portion 450 of buffer 3 (430). Coprocessor unit B 207 doesn't have to finish its operations on macroblock (1,1) within stage four 830. It can continue working on macroblock (1,1) into the fifth stage 840, as explained below. Also during stage four 830, unit A 205 of co-processor 206 continues and finishes its processing of macroblock (0,1) (assuming that co-processor unit A 205 did not complete its processing of macroblock (0,1) in stage three 820). The processed data is stored in the data area 460 of buffer 2 (420).

Also in stage four 830, hardware accelerator 208 performs its decoding function(s) with respect to macroblock (1,0). Hardware accelerator 208 reads the control data and substantive data from buffer 1 (410). Hardware accelerator 208 processes the substantive data and stores the newly processed data in the data area 460 of buffer 1 (410). Hardware accelerator 210 performs its decoding function(s) on macroblock (0,0) during stage four 830. Hardware accelerator 210 reads the control data and substantive data from buffer 0 (400). Note that the data in buffer 0 (400) was placed there by hardware accelerator 208 in stage three 820. Hardware accelerator 210 processes the substantive data and stores the newly processed data in the data area 460 of buffer 0 (400).

When all of the modules 202, 205, 208, 210, except co-processor unit B 207, have completed their stage four tasks, the core processor 202 initiates the fifth pipeline stage 840. In stage five 840, the core processor 202 starts the processing of macroblock (0,2). When the core processor 202 has extracted enough control information, co-processor unit A 205 begins' processing macroblock (0,2). The core processor 202 then performs other operations with respect to macroblock (0,2), including extracting the control data to be used by other modules in the decoding of macroblock (0,2). The core processor 202 stores the extracted control data in the header portion 450 of buffer 4 (440). Co-processor unit A 205 doesn't have to finish its operations on macroblock (0,2) within stage five 840. It can continue working on macroblock (0,2) into the sixth stage 850. Also during stage five 840, unit B 207 of co-processor 206 continues and finishes its processing of macroblock (1,1) (assuming that co-processor unit B 207 did not complete its processing of macroblock (1,1) in stage four 830). The processed data is stored in the data area 460 of buffer 3 (430).

Also in stage five 830, hardware accelerator 208 performs its decoding function(s) with respect to macroblock (0,1). Hardware accelerator 208 reads the control data and substantive data from buffer 2 (420). Hardware accelerator 208 processes the substantive data and stores the newly processed data in the data area 460 of buffer 2 (420). Hardware accelerator 210 performs its decoding function(s) on macroblock (1,0) during stage five 840. Hardware accelerator 210 reads the control data and substantive data from buffer 1 (410). Hardware accelerator 210 processes the substantive data and stores the newly processed data in the data area 460 of buffer 1 (410). Finally, in stage five 840, the bridge module 204 transfers the data in the data portion 460 of buffer 0 (400) to its output destination. In an illustrative embodiment of the present invention, the data is transferred to system memory 110, while in another embodiment, it goes to display engine 120. Note that the data in buffer 0 (400) was placed there by hardware accelerator 210 in stage four 830 and represents the finally decoded version of the substantive data of macroblock (0,0). After this stage, buffer 0 (400) is free.

At the beginning of the sixth stage 850, buffer 0 (400) is free. The core processor 202 works on macroblock (1,2) and stores the extracted data in buffer 0 (400), while the other modules continue processing for their corresponding next data units in the manner described above. This pipeline decoding process continues until all of the incoming data units have been decoded and transferred to the output destination.

A total of five buffers in the decoder memory 212 are used for the illustrative pipelined media processing of FIG. 8. Information and storage are shared among different modules and stages. The flexibility that is desirable for some media coding formats is readily achievable using the memory utilization strategy demonstrated with respect to the dual-row decoding scheme of FIG. 8.

Involving both units of the co-processor 206 in the decoding pipeline and allowing the co-processor 206 to begin performing its functions in the same pipeline stage that the core processor 202 works on a given data unit and to finish those functions in the next stage improve the efficiency of the decoding pipeline, especially when the task assumed by the co-processor 206, such as variable-length decoding, is the critical path, which may be the case for MPEG2 HD video. The task is allowed two stages to finish but the pipeline is still advanced based on the time it takes to complete just one stage. One very significant advantage of this scheme over other schemes is that one co-processor unit processes an entire row, rather than handing the row back and forth between the two (or more) co-processor units. A continuous flow leads to simpler, more reliable and more efficient operation.

As previously explained, there are two major existing schemes for passing the control information and processed data among the various modules in a decoding pipeline. One of these schemes is to implement hardwired controls along the pipeline and the other is to provide each module in the pipeline with is own input and output buffers. With the in-place memory scheme of the present invention, buffer allocation is programmable. Only one buffer is used for the entire life cycle of the processing of a data unit, instead of passing the control data and substantive data for a data unit along multiple buffers between stages. With the present invention, control information is passed between stages in a flexible way, rather than being hardwired. Control information is written to the buffer only once instead of being propagated through the pipeline. The pipeline design and control are flexible and adaptive to the media coding format and the information passing is efficient, which is almost impossible for the existing schemes of data unit management.

The data unit management scheme of the present invention provides flexible and efficient support for multiple media coding formats in a cost effective way. The software/firmware for supporting the data unit management scheme is relatively easy to develop. Also, the software and firmware is easily expandable to support future new coding formats.

Although a preferred embodiment of the present invention has been described, it should not be construed to limit the scope of the appended claims. For example, the present invention is applicable to any type of coded media data, such as audio data and graphics data, in addition to the video data illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A decoding system for decoding an encoded data element comprising a header portion and a data portion, the header portion comprising control data and the data portion comprising substantive data, the system comprising:
 a memory unit comprising a first memory element configured to store the data element, the first memory element comprising a header portion and a data portion, the header portion configured to store a header portion of the data element, the data portion configured to store a data portion of the data element;
 a first decoding element operable to receive the data element stored in the first memory element and to perform a first decoding function on the data portion of the data element and to deposit a result of the first decoding function in the data portion of the first memory element, the first decoding element being operable to perform the first decoding function according to a parameter in the header portion of the data element; and
 a second decoding element operable to receive the header portion of the data element and the result of the first decoding function stored in the first memory element and to perform a second decoding function on the result of the first decoding function, the second decoding element being operable to perform the second decoding function according to a parameter in the header portion of the data element.

2. The system of claim 1 wherein the depositing of the result of the first decoding function in the data portion of the first memory element by the first decoding element does not affect the data in the header portion of the first memory element.

3. The system of claim 1 wherein the encoded data element is part of an encoded data stream comprising a plurality of encoded data elements each comprising a header portion and a data portion and wherein the memory unit further comprises a second memory element configured to store a data element, the second memory element comprising a header portion and a data portion.

4. The system of claim 3 wherein the first decoding element is operable to receive a second data element stored in the second memory element and to perform the first decoding function on the data portion of the second data element according to a parameter in the header portion of the second data element while the second decoding element is performing the second decoding function on the data portion of the first data element, and to deposit the result of the first decoding function in the data portion of the second memory element.

* * * * *